Aug. 8, 1939.  B. M. YEAMAN  2,168,639
RABBIT FEEDER
Filed Oct. 23, 1937
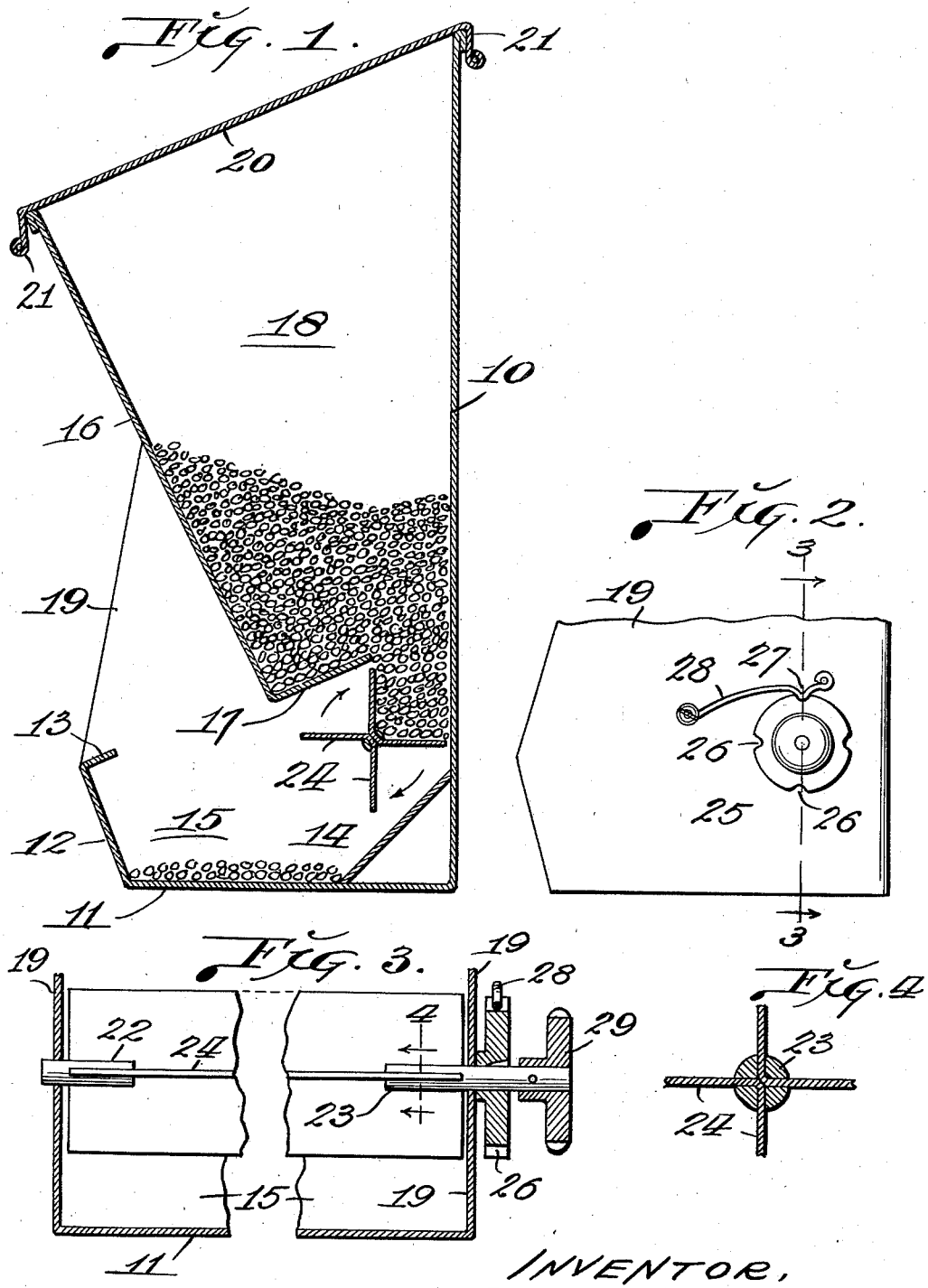
INVENTOR,
BRUCE M. YEAMAN.
BY Martin P. Smith ATTY.

Patented Aug. 8, 1939

2,168,639

UNITED STATES PATENT OFFICE 2,168,639

RABBIT FEEDER

Bruce M. Yeaman, Glendale, Calif.

Application October 23, 1937, Serial No. 170,577

3 Claims. (Cl. 119—56)

My invention relates to a rabbit feeder of the hopper type although the feeder may be advantageously used for feeding poultry, and in larger sizes, it may serve as a feeder for sheep, hogs and other livestock.

The principal objects of my invention are, to provide a feeder of the hopper type that will hold considerably more than one day's supply of pellets, wheat, barley, oats, corn or mash, and the feeder including a manually operable rotary member for controlling and regulating the discharge of food from the main supply chamber in the feeder to the feeding trough in the lower portion of the structure.

Further objects of my invention are, to provide a feeder of the character referred to that is constructed so as to practically eliminate waste of food by the animals eating from the feeding trough, and further, to construct the feeder so that when the storage chamber in the upper portion of the feeder is filled with food, the greater portion of the weight thereof will be supported by certain of the walls of the structure, thus relieving the manually operable member that regulates the transfer of food from the supply chamber to the trough, consequently enabling said rotary member to be readily manipulated to discharge a predetermined amount of food into the feeding trough.

With the foregoing and other objects in view, my invention consists in certain novel features of construction and arrangements of parts that will be hereinafter more fully described and claimed and illustrated in the accompanying drawing in which:

Fig. 1 is a vertical section taken through the center of a feeder constructed in accordance with my invention.

Fig. 2 is an end elevational view of the lower portion of the feeder.

Fig. 3 is an enlarged vertical section taken on the line 3—3 of Fig. 2.

Fig. 4 is an enlarged detail section taken on the line 4—4 of Fig. 3.

All parts of the body of my improved feeder are preferably constructed from galvanized sheet metal, although other thin material may be used, and the body of the feeder comprises a vertically disposed rear wall 10, a bottom 11 that extends forwardly in a horizontal plane from the lower end of the rear wall, and a short lower front wall 12 that extends upwardly and outwardly from the front of the bottom 11; the upper portion of the material forming this lower front wall 12 is extended upwardly and rearwardly to form a narrow flange 13.

Secured to the corner between the lower portion of rear wall 10 and rear portion of bottom 11 is a partition 14, that occupies an inclined position of approximately 44°, and the space 15 above the bottom 11 and between this partition 14 and front wall 12 constitutes the feeding trough from which the animals or poultry obtain their food.

The flange 13 that projects inwardly and upwardly from the upper edge of the front wall 12 provides an effective guard, to prevent animals and poultry from scratching the food out of the feeding trough.

The upper front wall 16 of the feeder occupies an inclined position of aproximately 30 or 35° relative to a vertical plane, and the lower portion of the material forming this front wall is extended rearwardly and upwardly toward the rear wall 10 to form an inclined bottom 17, that partially closes the food storage chamber 18 between the rear wall 10 and front wall 16 and above said bottom wall 17. The upper edge of the front wall 16 terminates in a plane occupied by the upper edge of the rear wall 10, and suitably secured to the ends of rear wall 10, bottom 11, lower front wall 12 and upper front wall 16 are vertically disposed end walls 19, that close the ends of the feeding trough 15 and food storage chamber 18.

The top of the storage chamber is closed by a removable cover plate 20, provided on its edges with depending flanges 21 that extend downwardly over the upper edges of the walls 10, 16 and 19, thus effectually preventing rain, dust and the like from entering the food supply chamber 18, and such construction enabling the cover to be easily and quickly removed when the supply of food in chamber 18 is replenished.

Cover 20 occupies an inclined position so as to make it difficult for rabbits and other small animals and poultry to stand or perch thereon.

Mounted for rotation between the inclined partition 14 and inclined bottom 17 is a rotary member which, when actuated, transfers fixed amounts of food from the storage chamber 18 into the feeding trough 15. The position of this rotary member between the partition 14, bottom 17 and rear wall 10 provides a trap or valve to positively control the passage of food from the chamber 18 to trough 15, and the chambers or pockets between the veins or blades of the rotary member regulate the amount of food delivered into the feeding trough as said rotary member is manipulated.

This rotary member comprises short shafts 22 and 23 that are journalled in the end walls 19, approximately midway between the partition 14 and bottom 17, and secured to those portions of these shafts that project into the feeder are four veins or blades 24 disposed 90° apart.

As illustrated in Fig. 4, I prefer to slot the shafts 22 and 23 longitudinally and to insert in said slots the inner portions of the veins or blades.

When properly constructed and installed, the outer edges of the veins or blades 24 traverse a path immediately adjacent the under face of bottom 17, the inner face of rear wall 10 and the upper face of partition 14.

Suitably secured on shaft 23 just outside one of the end walls, is a disc 25, provided in its edge with notches 26 that correspond in position with the positions of the four veins or blades 25, thus the disc 25 constitutes a ratchet wheel, and adapted to engage in the notches 25 is the downwardly bent portion 27 of a spring pawl 28, one end of which is suitably secured to the end wall of the feeder.

Secured on the outer end of shaft 23 adjacent the ratchet wheel 25, is a hand wheel 29 by means of which the rotary member is actuated.

When the storage chamber 18 is filled or partially filled with a supply of food, the greater portion of the weight of the food is born by inclined bottom 17, and the lower portion of inclined front wall 16.

The rotary member that transfers the food from chamber 18 to trough 15 normally occupies a position with a pair of the blades 24 occupying a vertical plane and with the other pair of blades occupying a horizontal plane. Thus, the upper edge of the uppermost blade occupies a position just below the rear edge of inclined bottom 17 and the free edge of the rear one of the horizontal blades occupies a position immediately adjacent the rear wall 10. As a result of this arrangement the rotary member carries only a small part of the weight of the food within the storage chamber 18 and the size of the rotary member is such that each substantially triangular chamber between the blades 24 contains the proper amount of food for one feeding.

At feeding time, handle 29 is engaged and rotated a quarter turn, thus correspondingly rotating the shafts 22 and 23 and blades 24, and as a result, a predetermined amount of food will be carried downwardly from the supply immediately above the rear portion of the rotary member, and this predetermined amount will discharge into the inclined partition 14 and pass by gravity therefrom into the bottom of the feeding trough 14. When the rotary member has been rotated a quarter of a turn as just described, the bent portion 27 of the pawl will engage in one of the notches 26, thus yieldingly holding the rotary member against rotation until subsequently rotated by proper manipulation of the handle 29. Obviously, the rotary member may be rotated a half, three quarters or a full turn, depending of course upon the feeding requirements.

Thus it will be seen that I have provided a relatively simple, practical and inexpensive poultry and animal feeding device having a storage chamber adapted to contain considerably more than one day's food supply, and said feeder having simple and efficient means for conveniently transferring predetermined amounts of the food from the storage chamber into the feeding trough, and further, the upper front edge of the front wall of the trough is provided with a guard flange that is effective in preventing waste of food from the trough.

The rotary means utilized for transferring food from the storage chamber to the trough functions as a trap or valve to effectually prevent passage of food from the supply chamber to the trough, except when the rotary member is manually operated.

The position of said rotary member and its relation to the fixed parts of the feeder is such that it bears very little of the weight of the food contained in the storage chamber.

The hand wheel 29 and ratchet and pawl may be rotated on either end of the feeder, and if desired, the shaft that carries the hand wheel may be extended a sufficient distance to project outside the hutch or pen in which the feeder is located; thereby enabling the operator or attendant to actuate the feeder without entering the hutch or pen in which said feeder is located.

The end and rear walls of the structure may be provided with hooks or the like so that the feeder may be secured or anchored in a fixed position in a hutch or pen.

My improved feeder minimizes the time and labor ordinarily required in the periodic feeding of animals, poultry and the like, and the use of the rotary member insures the transfer of the proper amounts of food from the storage chamber to the feeding trough.

It will be understood that minor changes in the size, form and construction of the various parts of my improved rabbit feeder may be made and substituted for those herein shown and described without departing from the spirit of my invention, the scope of which is set forth in the appended claims.

I claim as my invention:

1. In a rabbit feeder, a plurality of walls arranged to form a food storage chamber and a feeding trough below said storage chamber, the wall in front of the storage chamber being inclined so that the width of the chamber between the front and rear walls gradually decreases toward the bottom of said chamber, the wall at the bottom of the storage chamber being inclined so that it projects upwardly and rearwardly toward the rear wall of the storage chamber, there being an opening formed between the rear upper edge of said inclined bottom wall and the rear wall of the storage chamber, and a winged member arranged for rotation between the rear portion of the feeding trough and the rear edge of the inclined bottom wall of the storage chamber, the axis of which rotary member is disposed in the same vertical plane with the rear edge of the inclined bottom wall of the storage chamber and the width of the wings of said rotary member being such that their outer edges traverse a circular path immediately adjacent the under face of the inclined bottom wall of the storage chamber and the wall to the rear of said storage chamber and feeding trough.

2. A rabbit feeder as set forth in claim 1 and with a ratchet wheel mounted on said rotary member outside the storage chamber, a resilient pawl mounted on one of the walls of the storage chamber for engaging the teeth of said ratchet wheel and a disc handle mounted on the axis of the rotary member adjacent said ratchet wheel.

3. A rabbit feeder as set forth in claim 1 and with an inclined partition arranged in the rear portion of the feeding trough below said winged rotary member.

BRUCE M. YEAMAN.